United States Patent Office 3,611,540
Patented Oct. 12, 1971

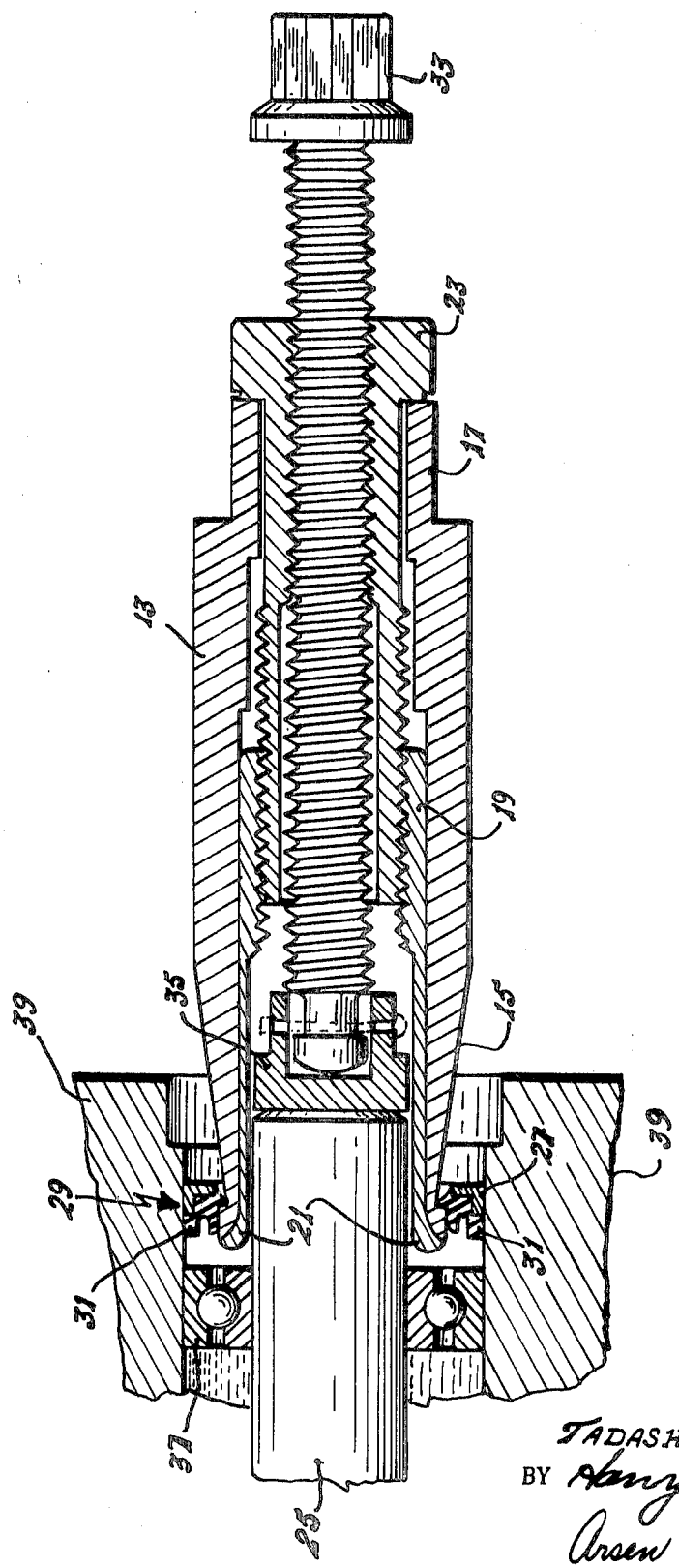

3,611,540
SEAL PULLER
Tadashi Gibu, Tachikawa, Japan, assignor to the United States of America as represented by the Secretary of the Air Force
Filed July 28, 1969, Ser. No. 845,364
Int. Cl. B23p 19/04
U.S. Cl. 29—263    2 Claims

ABSTRACT OF THE DISCLOSURE

A puller for extracting a sealing element from the housing of an aircraft accessories case having a drive shaft extending outwardly therefrom. The puller includes a hollow draw collet member with flexible finger elements which are positioned behind the seal and which move radially outward in response to the relative axial movement of a collet spreader to engage the inside circumference of the steel case of the seal. The tightening of a drive bolt against the end of the drive shaft then pulls the seal from the housing.

BACKGROUND OF THE INVENTION

This invention relates to a tool for extracting a sealing element or the like from a housing and, more particularly, the invention is concerned with providing an improved tool which is suitable for removing a seal which fitted in a housing and which surrounds a shaft extending outward from the housing.

It has become common to employ metal rings combined with resilient material for sealing oil or other liquids within casings or bearings where shafts extend therethrough.

Various types of tools have been available for removing these seals from their firm position in their seats. Most of the presently known tools useful for this purpose have a tendency to expand the metal part of the seal and cause it to bind in its seat and become lodged in the casing. This causes the seal to balloon out and tear when any further attempt is made at removal. Once the seal case balloons or tears, it becomes practically impossible to remove by any method other than by using a screwdriver to pry the seal out of the housing.

It can be seen that this latter procedure can be extremely hazardous in that damage to the casing or shaft or both will result if the screwdriver slips. Also, the procedure can be extremely time-consuming as well. Thus, it would be desirable to have a relatively simple and rugged tool which would facilitate the removal of ring seals from casings with a minimum expenditure of time and effort without danger of damage to the casing or the shaft.

SUMMARY OF THE INVENTION

The present invention provides a tool capable of use as a universal seal puller for extracting a ring seal positioned in a casing and having a shaft extending outwardly therethrough. The front part of the tool is hollow and is inserted over the shaft between the ring seal and the shaft. Flexible fingers at the forwardmost end of the tool are caused to spread behind the seal and engage the inside circumference of the metal ring portion. By turning a drive bolt positioned against the end of the shaft, the engaged seal is caused to be pulled from the casing and subsequently may be easily disengaged from the tool.

Accordingly, it is an object of the invention to provide a tool which may be utilized to remove encased ring seals easily and quickly without injury to the surrounding casing or shaft.

Another object of the invention is to provide a seal puller for extracting a sealing element from the housing of an aircraft accessories case having a shaft extending outwardly therefrom.

Still another object of the invention is to provide a seal puller having a hollow draw collet member with flexible finger elements for positioning behind the seal. The fingers move radially outward in response to the relative movement of a collet spreader.

A further object of the invention is to provide a seal puller having a rotatable drive bolt for positioning against the end of a shaft such that the rotation of the drive bolt causes the seal, which is engaged by finger elements, to be drawn out of the casing in which it was installed.

A still further object of the invention is to provide a tool for extracting a ring seal from an aircraft accessory casing wherein the seal is positioned around a shaft and the forward end of the tool is hollow to accommodate the shaft and fit between the shaft and the seal.

Another still further object of the invention is to provide a seal puller which can be manufactured from readily available materials by well known machining procedures.

These and other objects, features and advantages will become more apparent after considering the description that follows taken in conjunction with the attached drawing.

DESCRIPTION OF THE DRAWING

The figure is a cross-sectional view of the seal puller according to the invention in position over the shaft showing the relative locations of the various elements prior to spreading of the collet finger elements.

DESCRIPTION OF A PREFERRED EMBODIMENT

Referring now to the drawing, the seal puller according to the invention includes a hollow draw collet or tool body 13 having a forward portion which includes a plurality of flexible finger elements 15 and a rearward portion having a hexagonal head 17. A collet spreader 19 is positioned concentrically within the tool body 13 and moves axially relative thereto causing the finger elements 15 to spread when an enlarged portion 21 engages the tips of the finger elements 15.

A collet drive bolt 23 threadably engages the rearward portion of the spreader collet 19 and produces the axial movement of the spreader collet 19 and corresponding spreading of the finger elements 15 when rotated in the clockwise direction. The spreader collet 19 is hollow and dimensioned to fit loosely over the protruding end of the drive shaft 25. When the tool body 13 and the spreader collet 19 are in the unexpanded or retracted position as shown in the figure, the combined thickness of the forward end is such that the puller can be inserted between the shaft 25 and the metal portion 27 of the seal 29. In order to position the puller behind the seal 29 it is necessary to push past the resilient portion 31 which then remains partially compressed at the tips of the finger elements 15.

A seal drive bolt 33 having a swivel cap 35 pivotably attached to its forward end threadably engages the collet drive bolt 23. The swivel cap 35 abuts the end of the shaft 25 and the seal drive bolt 33 is in axial alignment with the shaft 25. In a typical installation, a bearing 37 is positioned in the casing 39 behind the seal 29 and supports the drive shaft 25 while rotating during operation as a propeller alternator and tachometer drive means or the like.

MODE OF OPERATION

In operation, the front part of the puller is inserted into the resilient portion 31 of the inside diameter of the seal 29 between the metal portion 27 and the shaft 25. The hollow part of the spreader collet 19 slips over the outer end of the drive shaft 25. The shoulders of the flexible finger elements 15 are pushed past the resilient portion 31 which includes the sealing edge of the seal 29 so as to rest behind the metal portion 27.

The collet drive bolt 23 is then turned clockwise while at the same time the tool body 13 is held to prevent it from rotating. The relative rotating motion of the collet drive bolt 23 causes the spreader collet 19 to move axially outward while the tool body 13 remains stationary. The enlarged portion 21 of the spreader collet 19 presses against the forward tips of the finger elements 15 forcing them to spread and engage the inside circumference of the metal portion 27 of the seal 29.

After the seal 29 has been engaged by the finger elements 15, the seal drive bolt 33 is turned clockwise while the collet drive bolt 23 is held firmly to prevent rotation of the other threaded elements. This action applies pressure on the swivel cap 35 which in turn applies pressure on the end of the drive shaft 25 causing the tool body 13 along with the collet spreader 19, collet drive bolt 23 and the engaged seal to be extracted from the casing 39. The seal 29 can then be easily disengaged and removed from the finger elements 15 of the seal puller tool body 13.

The hereinbefore described tool is very simple to operate and extremely effective for the purposes set forth. As previously stated, the tool has many advantages over other types of tools designed for this purpose. Among the important advantages is the saving in time gained by the use of the tool. For example, it may ordinarily take a trained machinist two to five hours to remove one oil seal using the previously available tool, especially designed for the operation; whereas, two of the same seals can be removed in fifteen minutes using the hereinbefore described tool.

Although the invention has been illustrated in the accompanying drawing and described in the foregoing specification in terms of a preferred embodiment thereof, the invention is not limited to this embodiment or to the particular configuration mentioned. It will be apparent to those skilled in the art that, while my invention is illustrated as a seal puller, with appropriate modifications, it may be adapted for use in a wide variety of operations. Also, it should be understood that various changes, alterations and substitutions, particularly with respect to the construction details, can be made in the arrangement of the several elements while still remaining within the true spirit and scope of the appended claims.

I claim:
1. A puller for extracting a circular sealing element from a housing having a drive shaft extending outwardly therefrom, said puller comprising an elongated hollow tool body having a tapered outer surface and a straight inner surface, a plurality of flexible finger elements formed by longitudinal slots in the forward end of said tool body, a curved lip portion on the forwardmost end of the flexible finger elements on said hollow tool body, a hollow collet spreader concentrically positioned within said tool body and dimensioned to fit loosely over the drive shaft, said collet spreader having a curved enlarged forwardmost portion for complementary engagement with the curved lip portion of said flexible finger elements, a collet drive bolt threadably engaging the rearward portion of said collet spreader, the clockwise rotation of said collet drive bolt producing a corresponding relative axial movement of said collet spreader causing the curved enlarged portion thereof to operatively contact said curved lip portion and force the finger elements of said tool body radially outward to engage the inner circumference of the sealing element, and a seal drive bolt threadably engaging said collet drive bolt and positioned against the end of the drive shaft extending from the housing in which the sealing element is positioned, the clockwise rotation of said seal drive bolt causing said tool body and the engaged sealing element to be extracted from the housing.

2. The puller defined in claim 1 wherein a swivel cap is pivotably attached to the inner end of said seal drive bolt between the seal drive bolt and the drive shaft extending from the housing, said swivel cap serving to compensate for any axial alignment deviations between the seal drive bolt and the drive shaft.

References Cited
UNITED STATES PATENTS

| | | | |
|---|---|---|---|
| 2,069,012 | 1/1937 | Lynes | 254—86 |
| 2,290,427 | 7/1942 | Harrington | 29—265 |
| 2,614,318 | 10/1952 | McCord | 29—263 |

ANDREW R. JUHASZ, Primary Examiner

L. GILDEN, Assistant Examiner